(12) United States Patent
Wilson et al.

(10) Patent No.: US 7,175,380 B2
(45) Date of Patent: Feb. 13, 2007

(54) SLEWING RING BOOM MOWER

(75) Inventors: Kevin Wilson, Fischer, TX (US); Michael McCormick, San Marcos, TX (US); Jamey McCurry, Seguin, TX (US)

(73) Assignee: Alamo Group, Inc., Seguin, TX (US)

( * ) Notice: Subject to any disclaimer, the term of this patent is extended or adjusted under 35 U.S.C. 154(b) by 0 days.

(21) Appl. No.: 11/009,454

(22) Filed: Dec. 10, 2004

(65) Prior Publication Data

US 2005/0138911 A1    Jun. 30, 2005

Related U.S. Application Data

(60) Provisional application No. 60/528,538, filed on Dec. 10, 2003.

(51) Int. Cl.
  *B66C 23/00* (2006.01)
  *B66F 9/00* (2006.01)
  *E02F 3/00* (2006.01)

(52) U.S. Cl. .................. 414/695; 414/543; 56/14.7

(58) Field of Classification Search ............ 56/16.9, 56/12.1, 14.7, 266, 295, 15.6, 14.9, 15.2, 56/13.5; 37/302, 104, 301; 414/543, 695
See application file for complete search history.

(56) References Cited

U.S. PATENT DOCUMENTS

| | | | | |
|---|---|---|---|---|
| 3,087,296 A | * | 4/1963 | Cowles ................. 56/10.7 |
| 3,559,385 A | * | 2/1971 | Eaton ................... 56/10.7 |
| 3,601,169 A | * | 8/1971 | Hamilton et al. ....... 144/34.1 |
| 3,664,528 A | * | 5/1972 | Gauchet ................ 414/694 |
| 4,502,269 A | * | 3/1985 | Cartner ................ 56/15.5 |
| 4,769,977 A | * | 9/1988 | Milbourn .............. 56/15.2 |
| 4,873,818 A | * | 10/1989 | Turner ................. 56/10.8 |
| 4,956,965 A | | 9/1990 | Parsons, Jr. |
| 4,996,830 A | * | 3/1991 | Davison ............... 56/14.7 |
| 5,210,997 A | * | 5/1993 | Mountcastle, Jr. ..... 56/15.2 |
| 5,292,220 A | | 3/1994 | Cartner |
| 5,378,852 A | * | 1/1995 | Manor ................. 144/4.1 |
| 5,396,754 A | | 3/1995 | Fraley |
| 5,408,814 A | * | 4/1995 | Milbourn .............. 56/15.2 |
| 5,468,120 A | * | 11/1995 | Krob .................. 414/695 |
| 5,645,179 A | | 7/1997 | Mohar |
| 5,775,075 A | * | 7/1998 | Dannar ................ 56/15.2 |
| 6,192,665 B1 | * | 2/2001 | Asselin et al. .......... 56/16.9 |
| 6,409,457 B1 | * | 6/2002 | Korycan et al. ........ 414/501 |
| 6,640,528 B1 | * | 11/2003 | Rowland ............... 56/15.2 |
| 2003/0089508 A1 | * | 5/2003 | Pellenc et al. ......... 172/54.5 |

* cited by examiner

*Primary Examiner*—Árpád Fábián Kovács
(74) *Attorney, Agent, or Firm*—Haynes and Boone, LLP

(57) ABSTRACT

A vehicle includes a horizontal support frame mounted to the vehicle, a first slewing ring bearing moveably mounted on and substantially parallel to the horizontal support frame, an articulating boom having a first end mounted on the first slewing ring bearing and moveable relative to the frame, and a mower deck mounted on a second end of the articulating boom for positioning relative to the frame and the vehicle.

26 Claims, 17 Drawing Sheets

US 7,175,380 B2

SLEWING RING BOOM MOWER

CROSS REFERENCE TO RELATED APPLICATIONS

This application claims priority to coassigned U.S. Provisional Patent Application No. 60/528,538, filed Dec. 10, 2003, entitled SLEWING RING BOOM MOWER, naming Wilson, et al. as inventors, which is incorporated by reference in its entirety.

BACKGROUND

The present disclosure relates generally to vehicular mounted mowers and more particularly to a mower deck mounted on an articulating boom attached to a self propelled vehicle.

Tractors, such as those used in the agricultural and construction industries, include attachments for various applications. One such attachment is a boom mounted mower deck. When used for roadside mower applications, positioning and range of motion of the deck are important considerations. However, range is limited by stability compromises.

Accordingly, it would be desirable to provide an improved mounting for articulating booms used with a vehicle which permits an enhanced operational range without compromising stability.

SUMMARY

According to one embodiment, an attachment system for an articulating boom is provided that includes a support frame, a first slewing ring bearing moveably mounted on the frame, and an articulating boom mounted on the first slewing ring bearing and movable relative to the frame.

A principal advantage of this embodiment is that the range of movement of the articulating boom is enhanced without compromising stability.

BRIEF DESCRIPTION OF THE DRAWINGS

FIG. 4b is a top view illustrating an embodiment of the vehicle of FIG. 4a.

FIG. 6 is a perspective view illustrating an embodiment of the support frame and slewing ring bearing of FIG. 1 coupled to the vehicle of FIG. 4a.

FIG. 8b is a front view illustrating an embodiment of the vehicle, support frame, stewing rings, articulating boom arm, and mower deck of FIG. 8a.

FIG. 9b is a front view illustrating an embodiment of the vehicle, support frame, slewing rings, articulating boom arm, and mower deck of FIG. 9a.

FIG. 10b is a front view illustrating an embodiment of the vehicle, support frame, slewing rings, articulating boom arm, and mower deck of FIG. 10a.

FIG. 12b is a front view illustrating an embodiment of the vehicle, support frame, slewing rings, articulating boom arm, and mower deck of FIG. 12a.

FIG. 13b is a front view illustrating an embodiment of the vehicle, support frame, slewing rings, articulating boom arm, and mower deck of FIG. 13a.

DETAILED DESCRIPTION

Figure 1:
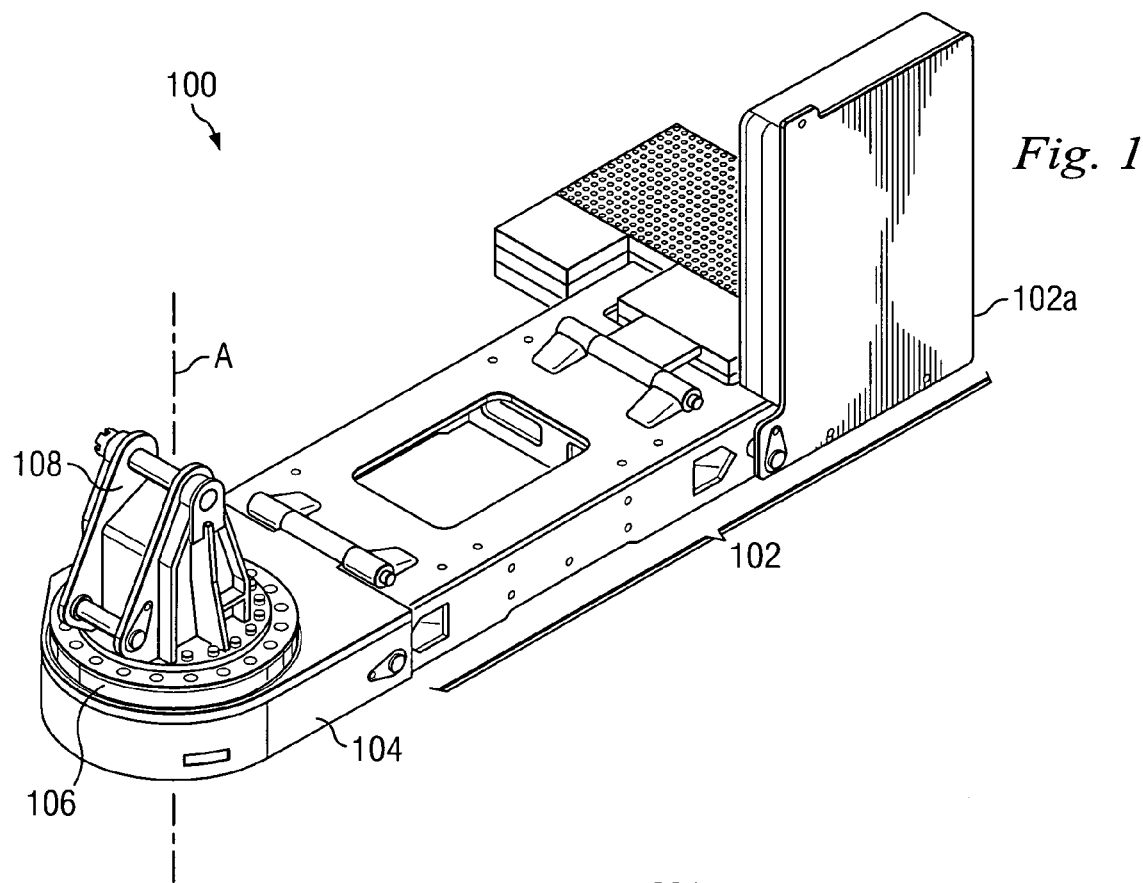
FIG. 1 is a perspective view illustrating an embodiment of a support frame and a slewing ring bearing.

Referring now to FIG. 1, a support frame 100 is illustrated. Support frame 100 includes a vehicle mounting section 102 having an end 102a. A boom mounting section 104 extends from a distal end of the vehicle mounting section 102 opposite the end 102a. A stewing ring bearing 106 is moveably coupled to the boom mounting section 104 and includes a boom mount 108 mounted to the stewing ring bearing 106. The moveable coupling of the stewing ring bearing 106 to the boom mounting section 104 and the mounting of the boom mount 108 to the slewing ring bearing 106 enable the boom mount 108 to rotate about an axis A relative to both the boom mounting section 104 and vehicle mounting section 102. In an embodiment, the boom mount 108 may rotate 360 degrees about axis A relative to the boom mounting section 104 and the vehicle mounting section 102.

Figure 2:
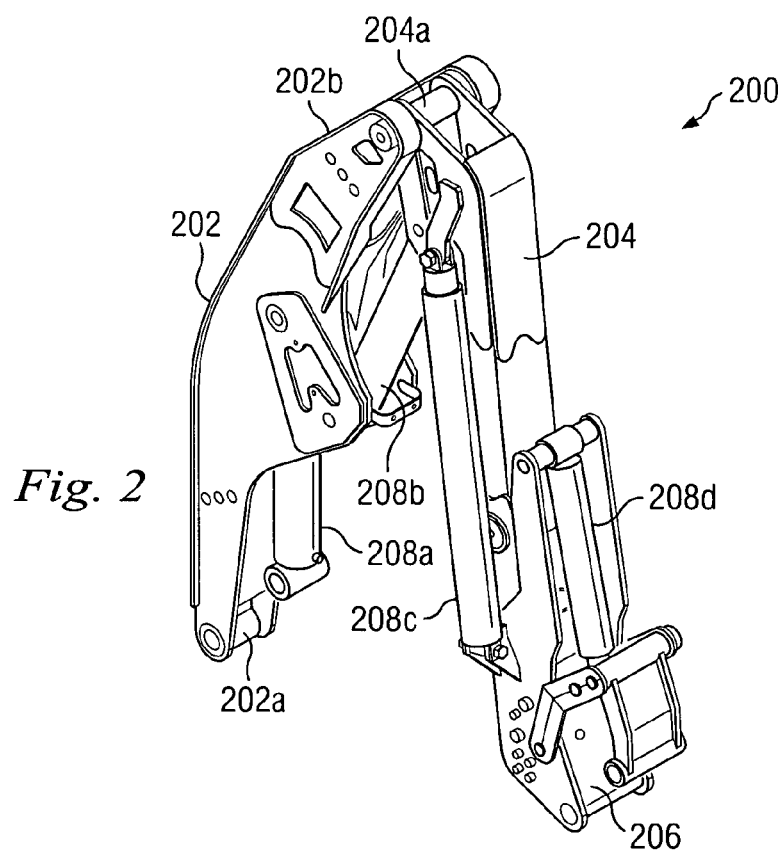
FIG. 2 is a perspective view illustrating an embodiment of an articulating boom arm.

Referring now to FIG. 2, an articulating boom arm 200 is illustrated. Articulating boom arm 200 includes an upper arm section 202 having a frame mounting end 202a and upper arm joint end 202b located on opposing distal ends of upper arm section 202. Upper arm joint end 202b is pivotally coupled to a lower arm section 204 at a lower arm joint end 204a on a distal end of lower arm section 204. A mower deck mount 206 is located on, and moveably coupled to, a distal end of lower arm section 204 opposite the lower arm joint end 204a. A plurality of actuators 208a, 208b, 208c, and 208d are coupled to the articulating boom arm 200, with actuator 208a coupled to the upper arm section 202, actuator 208b coupled to the upper arm section 202 and the lower arm section 204, actuator 208c coupled to the lower arm section 204 and the mower deck mount 206, and actuator 208d coupled to the mower deck mount 206. Actuators 208a, 208b, 208c, and 208d are operable to actuate the articulating boom arm 200 into a variety of positions, some of which will be described below.

Figure 3:
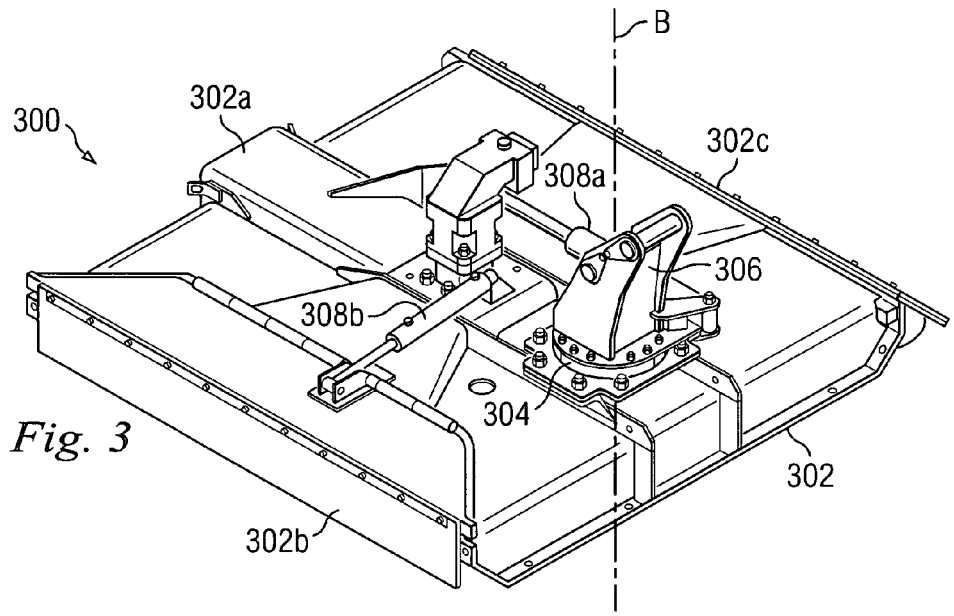
FIG. 3 is a perspective view illustrating an embodiment of mower deck and a slewing ring bearing.

Referring now to FIG. 3, a mower deck 300 is illustrated. Mower deck 300 includes a base 302 having a top 302a, a front 302b, and a rear 302c located opposite the front 302b. A stewing ring bearing 304 is moveable coupled to the top 302a of base 302 and includes a boom mount 306 mounted to the slewing ring bearing 304. The moveable coupling of the slewing ring bearing 304 to the top 302a of base 302 and the mounting of the boom mount 306 to the slewing ring bearing 304 enable the base 302 of mower deck 300 to rotate about an axis B relative to the boom mount 306. A plurality of actuators 308a and 308b are coupled to the mower deck 300 and operable to actuate the mower deck 300 into a variety of positions, some of which will be described below. In an embodiment, mower deck 300 may include a conventional mower blade known in the art which is operable to cut, trim, or remove unwanted vegetation. In an embodiment, the base 302 of mower deck 300 may rotate 360 degrees about axis B relative to the boom mount 306. In an embodiment, the mower deck may be, for example, a rotary mower deck, a flail mower deck, a sickle bar style mower deck, a cutter head mower deck, a mower deck with circular saw blades, a multi-spindle mower deck, or a variety of other equivalent mower decks known in the art.

Figure 4A:
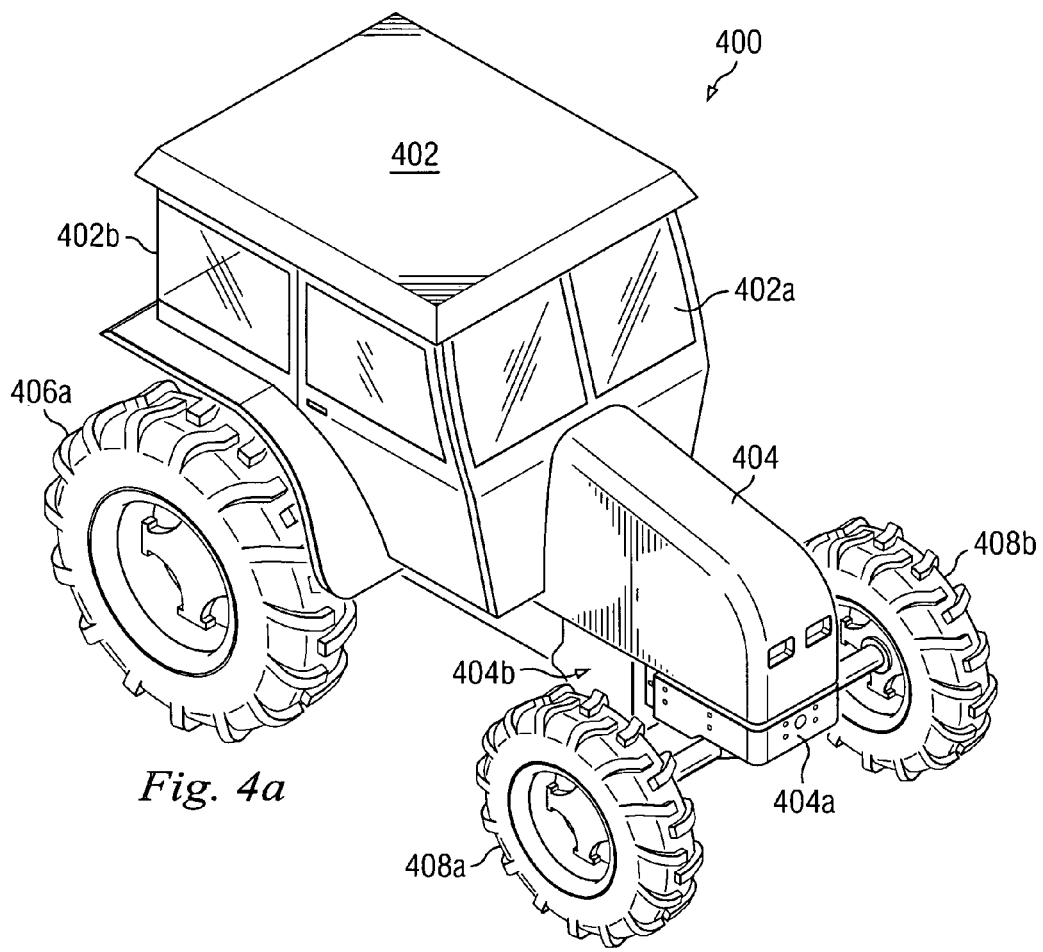
FIG. 4a is a perspective view illustrating an embodiment of a vehicle.
Figure 4B:
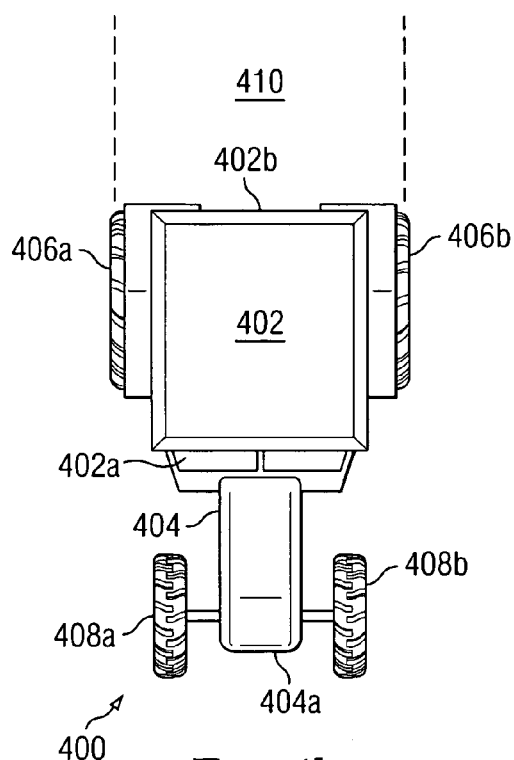

Referring now to FIGS. 4a and 4b, a vehicle 400 is illustrated. Vehicle 400 includes a cab 402 having a front 402a and a rear 402b located opposite the front 402a. An engine compartment 404 extends from the front 402a of cab 402 and includes a front 404a and defines a mounting channel 404b across its width and positioned along its length. A plurality of rear wheels 406a and 406b are mounted to the vehicle 400 and located adjacent the rear 402b of cab 402. A plurality of front wheels 408a and 408b are mounted to the vehicle 400 and located adjacent the front 404a of engine compartment 404. The rear 402b of cab 402 and the outermost sides of the plurality of rear wheels 406a and 406b define a volume 410 located behind the vehicle 400. In an embodiment, the vehicle may be, for example, a tractor, a truck, a bulldozer, a trailer, a rail car, a boat, an industrial construction vehicle, or a variety of other equivalent vehicles known in the art.

Figure 5:
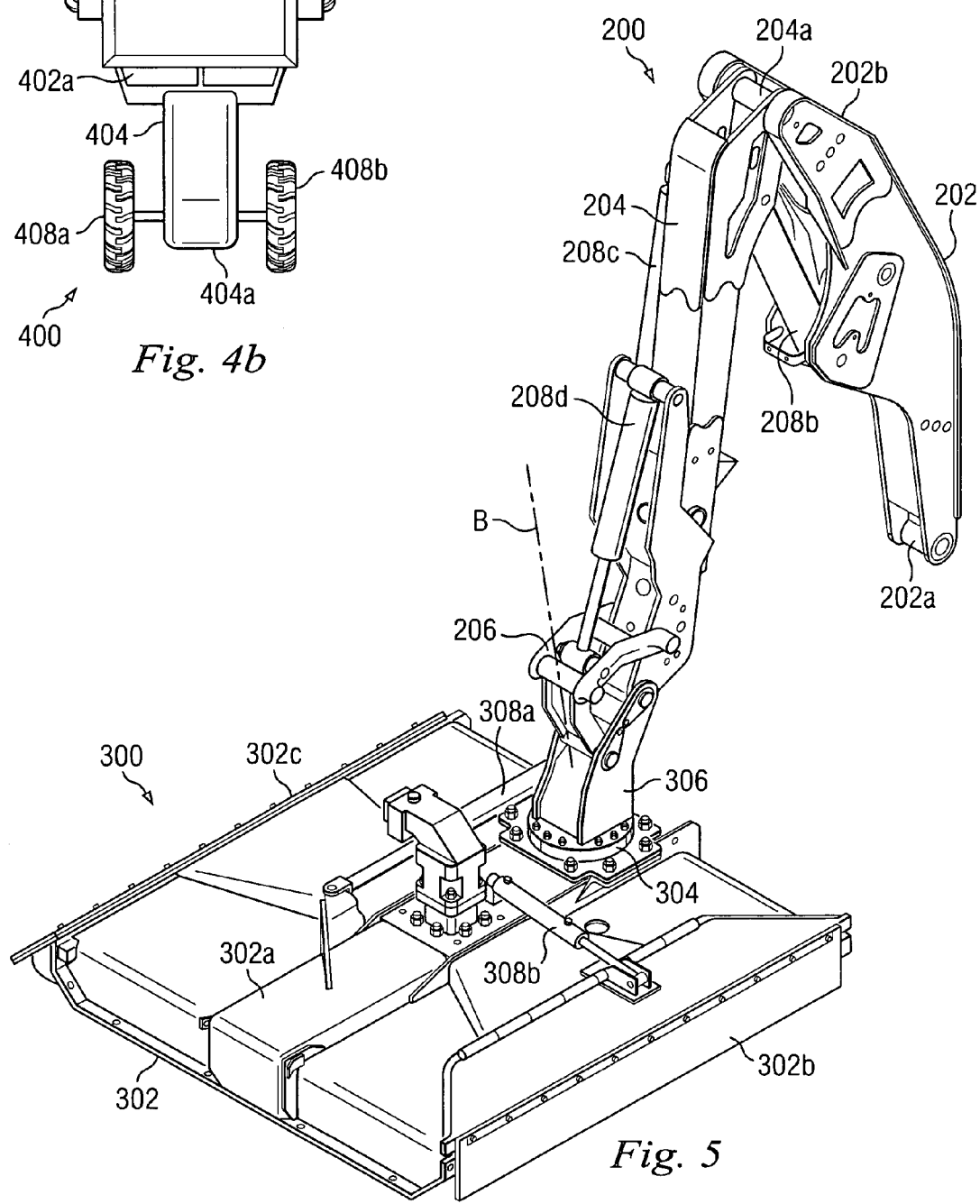
FIG. 5 is a perspective view illustrating an embodiment of the articulating boom arm of FIG. 2 coupled to the mower deck and slewing ring bearing of FIG. 3.

Referring now to FIG. 5, in assembly operation, the articulating boom arm 200 is coupled to the mower deck 300 by pivotally coupling the mower deck mount 206 on lower arm section 204 of articulating boom arm 200 to the boom mount 306 on mower deck 300. Due to the coupling of the slewing ring bearing 304 to the top 302a of base 302 and the mounting of the boom mount 306 to the slewing ring bearing 304, the mower deck 300 may rotate about the axis B relative to the articulating boom arm 200. In an embodiment, the mower deck 300 may rotate 360 degrees relative to the articulating boom arm 200.

Figure 6:
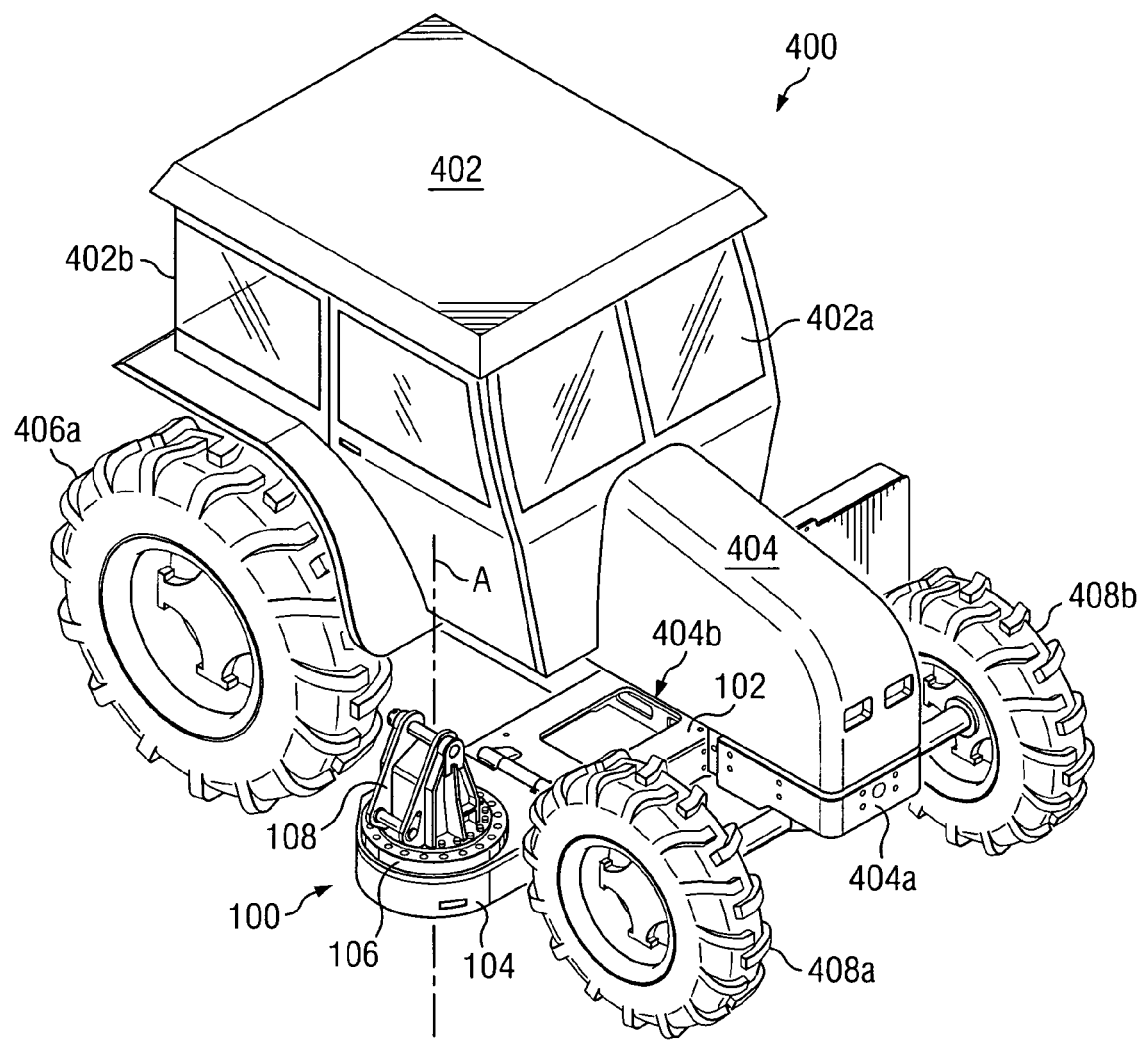

Referring now to FIG. 6, the support frame 100 is coupled to the vehicle 400 by mounting the vehicle mounting section 102 in the mounting channel 404b on vehicle 400. With the support frame 100 mounted the vehicle 400, the support frame 100 is substantially horizontal, with the boom mounting section 104 extending out from the vehicle 400 and located between rear wheel 406a and front wheel 408a, and with the slewing ring bearing 106 positioned horizontally such that its rotation axis A is substantially perpendicular to the ground. In an embodiment, the support frame 100 may be configured differently and mounted to the vehicle 400 such that the slewing ring bearing 106 is located adjacent the front 404a of engine compartment 404 on vehicle 400 and between front wheels 408a and 408b. In an embodiment, the support frame 100 may be configured differently and mounted to the vehicle 400 such that the slewing ring bearing 106 is located adjacent the rear 402b of cab 402 on vehicle 400 and between rear wheels 406a and 406b. In an embodiment, the support frame 100 may be configured differently and mounted to the vehicle 400 such that the slewing ring bearing 106 is located at the center of the vehicle 400. In an embodiment, the support frame 100 may be configured differently and mounted a trailer pulled by the vehicle 400.

Figure 7:
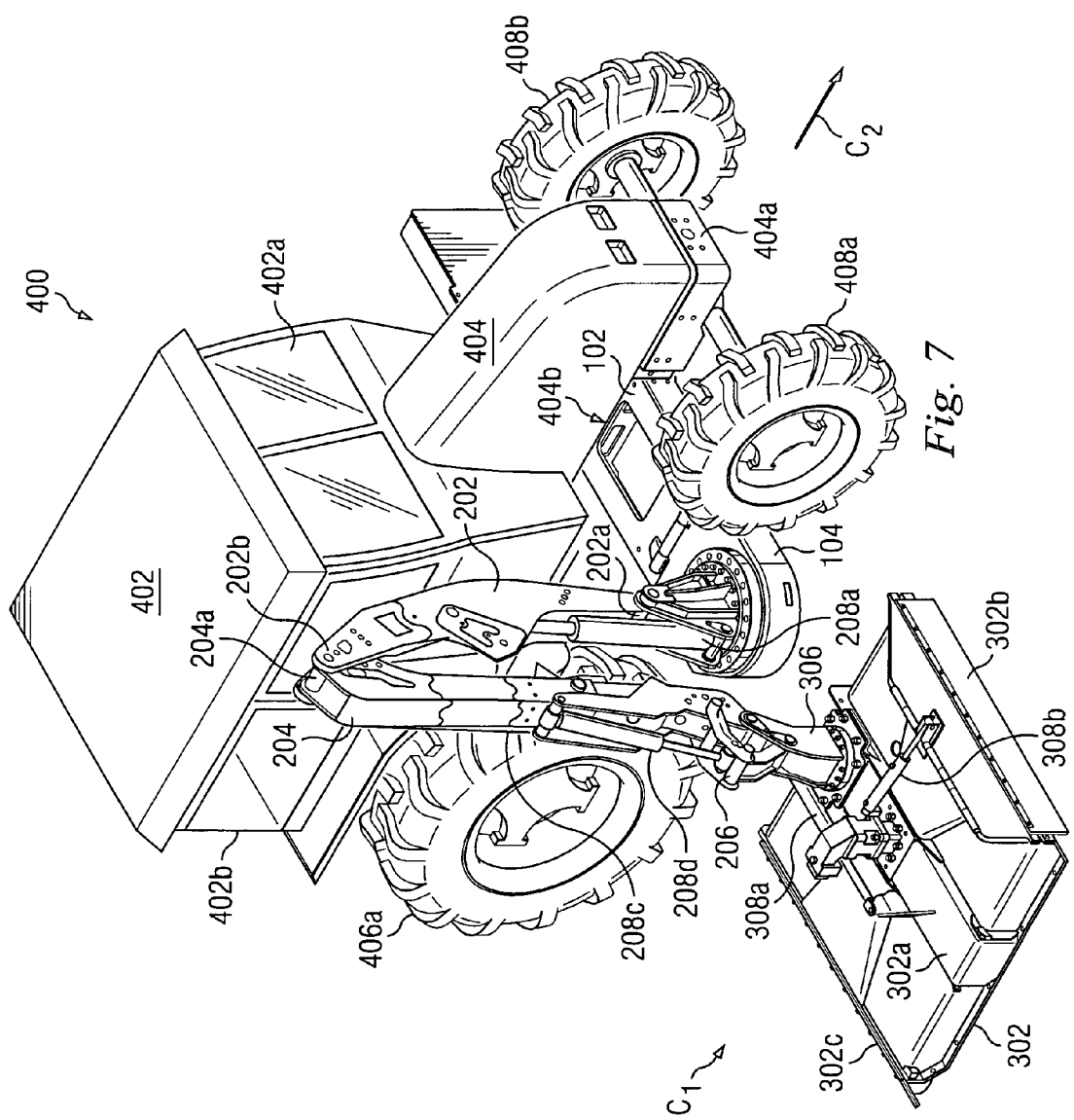
FIG. 7 is a perspective view illustrating an embodiment of the articulating boom arm and mower deck of FIG. 5 coupled to the support frame, slewing ring bearing, and vehicle of FIG. 6, with the mower deck positioned substantially adjacent a side of the vehicle.

Referring now to FIGS. 5, 6, and 7, the articulating boom arm 200 and mower deck 300 are coupled to the support frame 100 and vehicle 400 by pivotally coupling frame mounting end 202a on upper arm 202 of articulating boom arm 200 to boom mount 108 on support frame 100. A counter weight (not shown) may be coupled to the vehicle 400 to balance the weight of the articulating boom arm 200 and mower deck 300 on vehicle 400. Due to the coupling of the slewing ring bearing 106 to the boom mounting section 104 of support frame 100 and the mounting of the boom mount 108 to the slewing ring bearing 106, the articulating boom arm 200 and mower deck 300 may rotate about the axis A relative to the support frame 100 and vehicle 400. In an embodiment, the articulating boom arm 200 and mower deck 300 may rotate 360 degrees about axis A relative to the support frame 100 and the vehicle 400. As illustrated, the articulating boom arm 200 and mower deck 300 provide a rotational range of substantially 180 degrees about axis A relative to the support frame 100 and the vehicle 400 due to the configuration of the vehicle 400 and the support frame 100.

Referring now to FIG. 7, in operation, the mower deck 300 may be placed in a position $C_1$. In position $C_1$, the mower deck 300 is located substantially adjacent to the side of vehicle 400 including rear wheel 406a and front wheel 408a, with the front 302b of mower deck 300 substantially perpendicular to a direction $C_2$ of motion of the vehicle 400. Thus, a mower deck 300 position $C_1$ is provided which allows the mower deck 300 to cover an area which is substantially adjacent the side of the vehicle 400.

Figure 8A:
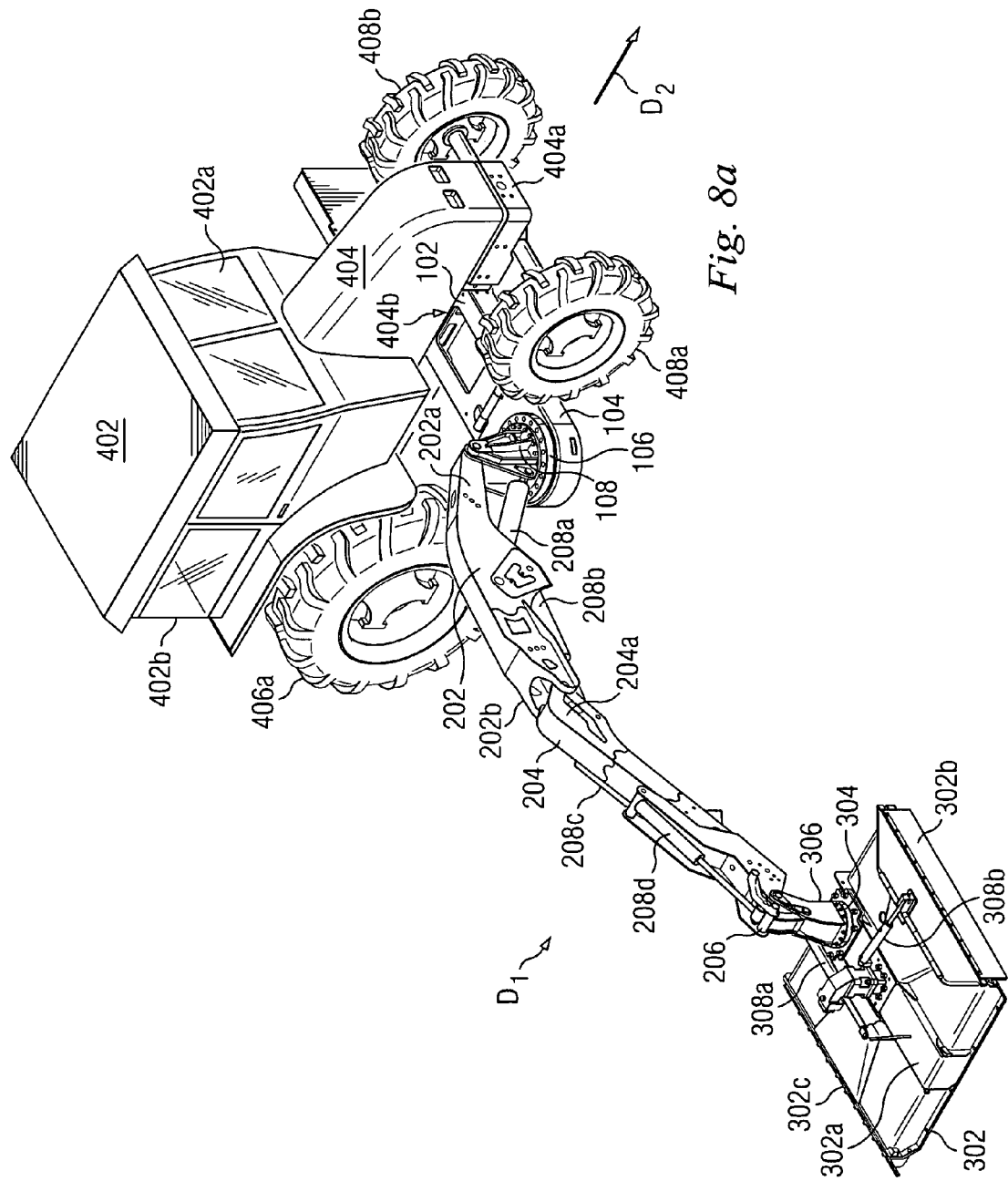
FIG. 8a is a perspective view illustrating an embodiment of the vehicle, support frame, slewing rings, articulating boom arm, and mower deck of FIG. 7, with the mower deck positioned spaced apart from, and level with, the vehicle.
Figure 8B:
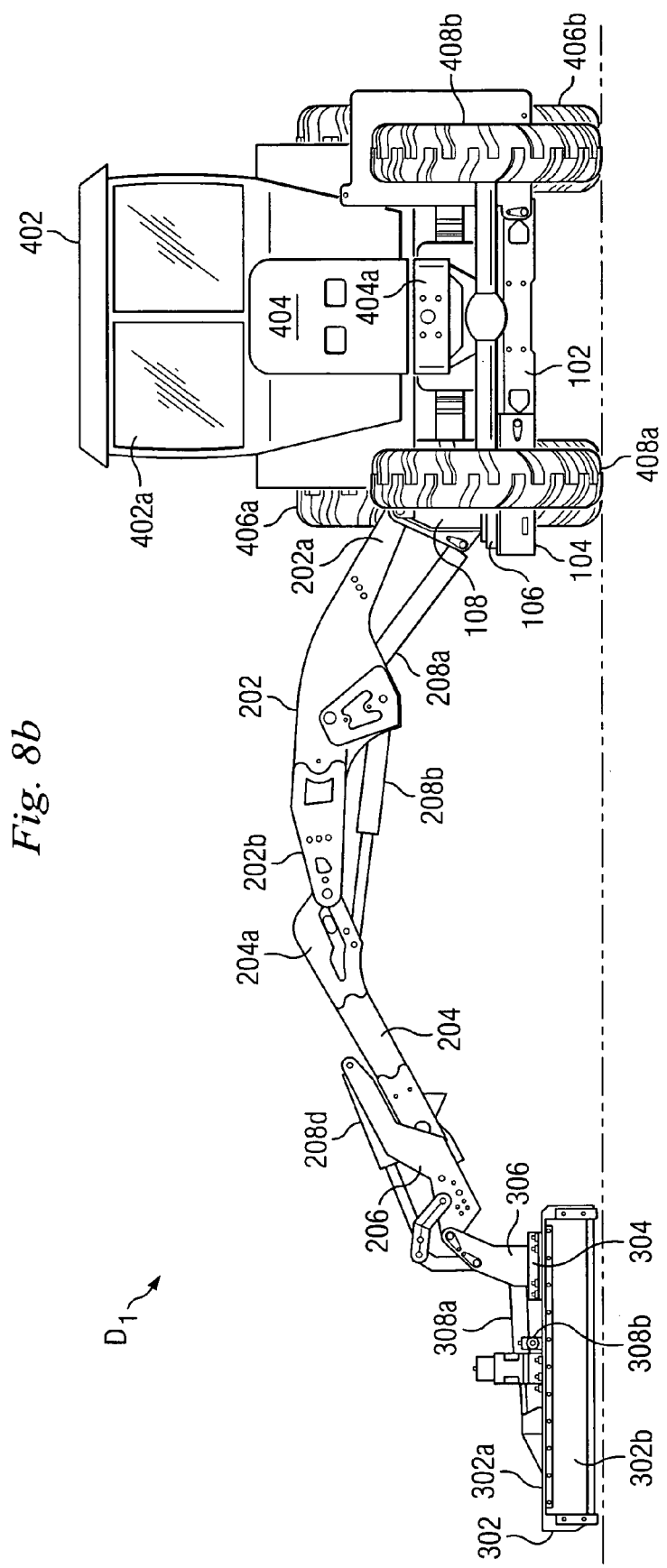

Referring now to FIGS. 8a and 8b, the mower deck 300 may be placed in a position $D_1$. In position $D_1$, the articulating boom arm 200 is extended and the mower deck 300 is located spaced apart from the side of, and level with, the vehicle 400, with the front 302b of mower deck 300 substantially perpendicular to a direction $D_2$ of motion of the vehicle 400. Thus, a mower deck 300 position $D_1$ is provided which allows the mower deck 300 to cover an area which is spaced apart from the side of, and level with, the vehicle 400.

Figure 9A:
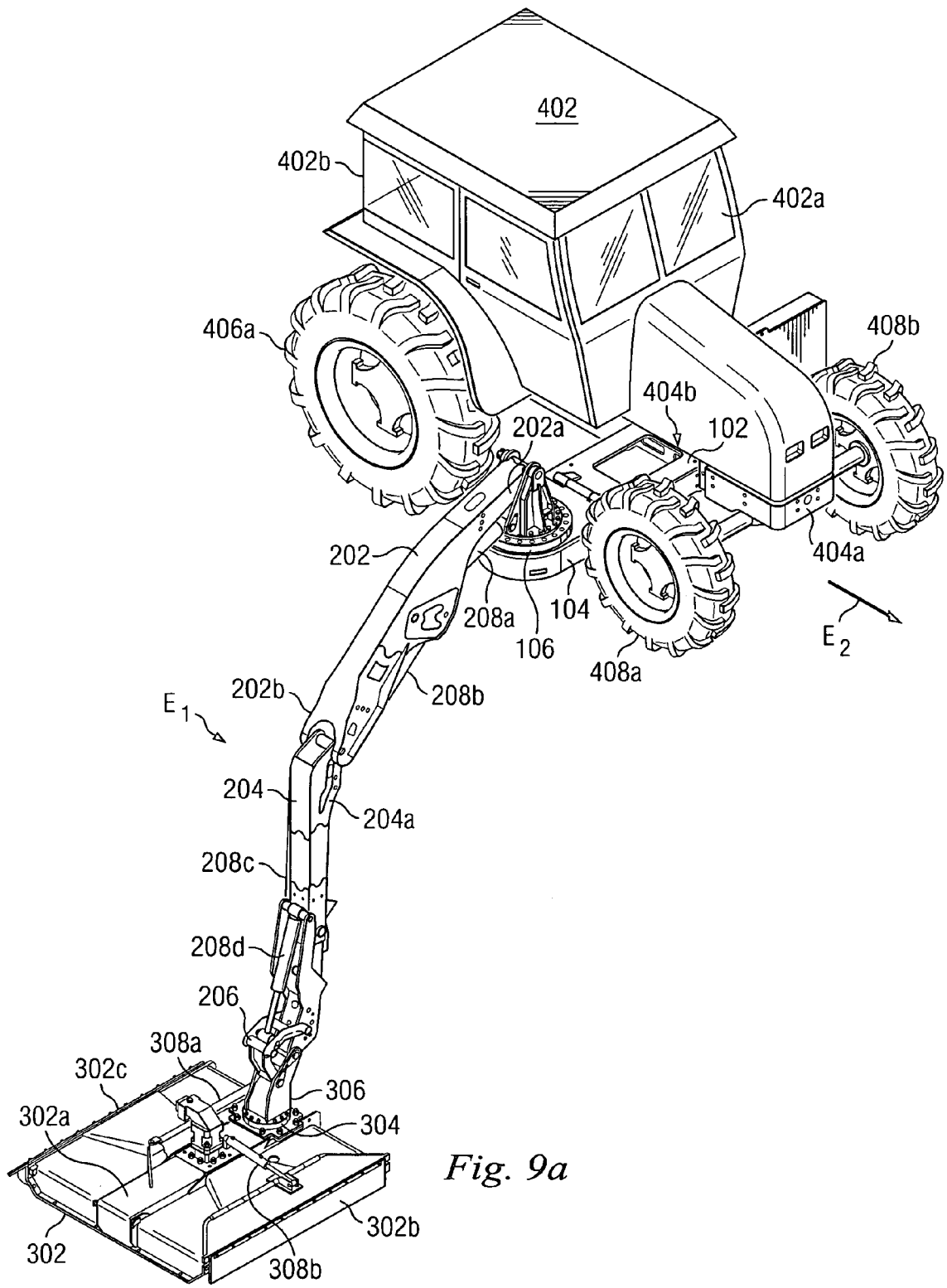
FIG. 9a is a perspective view illustrating an embodiment of the vehicle, support frame, stewing rings, articulating boom arm, and mower deck of FIG. 7, with the mower deck positioned spaced apart from, and below, the vehicle.
Figure 9B:
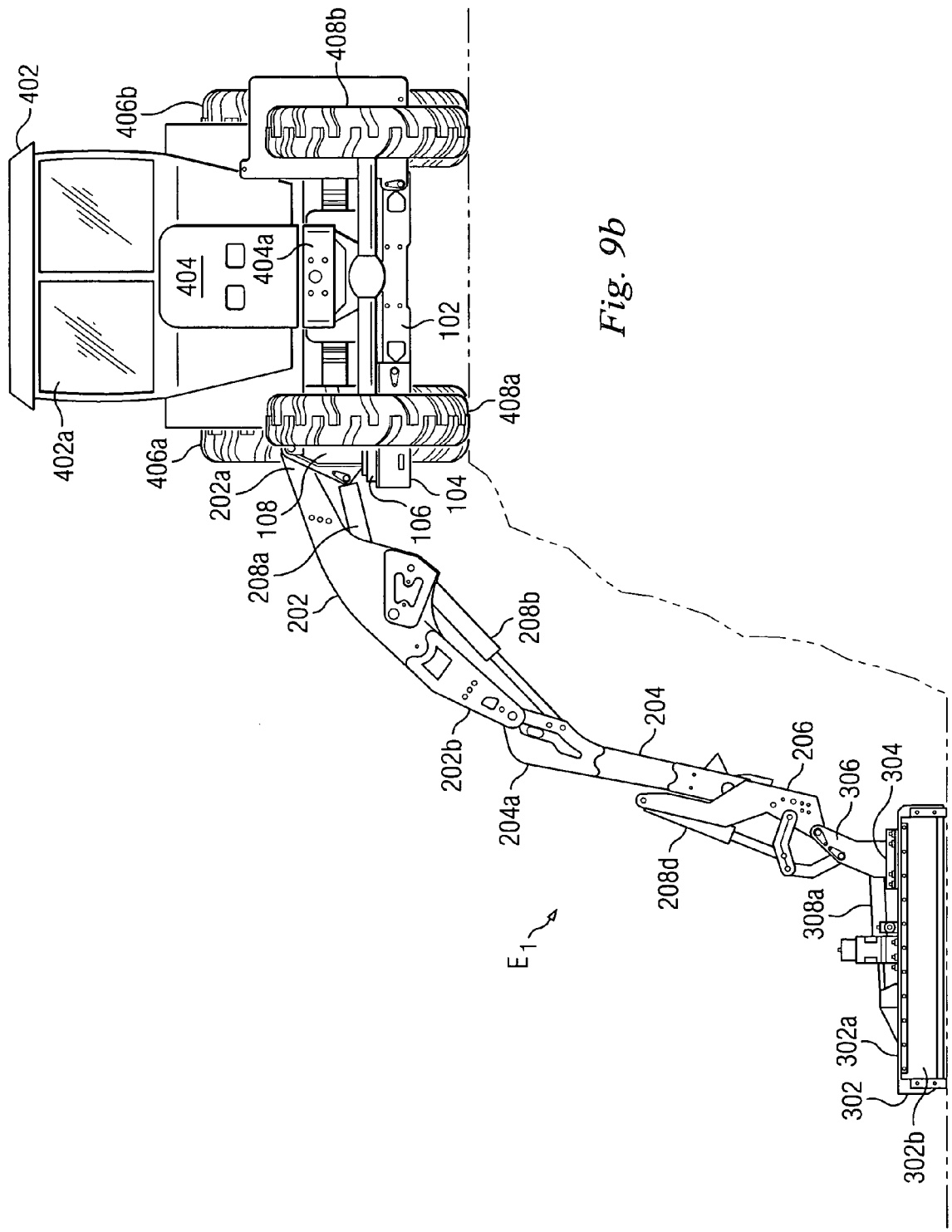

Referring now to FIGS. 9a and 9b, the mower deck 300 may be placed in a position $E_1$. In position $E_1$, the articulating boom arm 200 is extended and the mower deck 300 is located spaced apart from the side of, and below, the vehicle 400, with the front 302b of mower deck 300 substantially perpendicular to a direction $E_2$ of motion of the vehicle 400. Thus, a mower deck 300 position $E_1$ is provided which allows the mower deck 300 to cover an area which is spaced apart from the side of, and below, the vehicle 400.

Figure 10A:
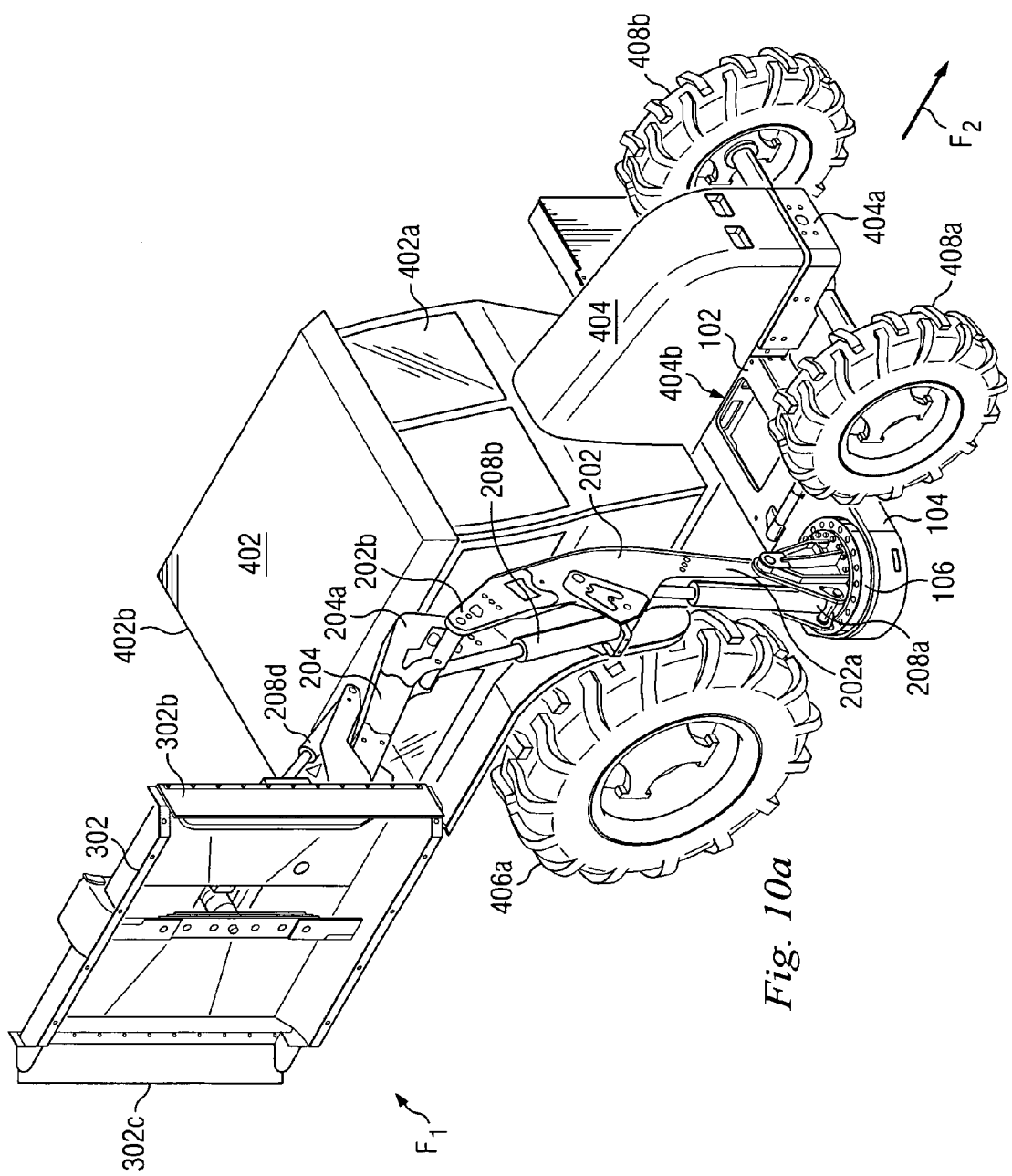
FIG. 10a is a perspective view illustrating an embodiment of the vehicle, support frame, slewing rings, articulating boom arm, and mower deck of FIG. 7, with the mower deck positioned spaced apart from, and above, the vehicle.
Figure 10B:
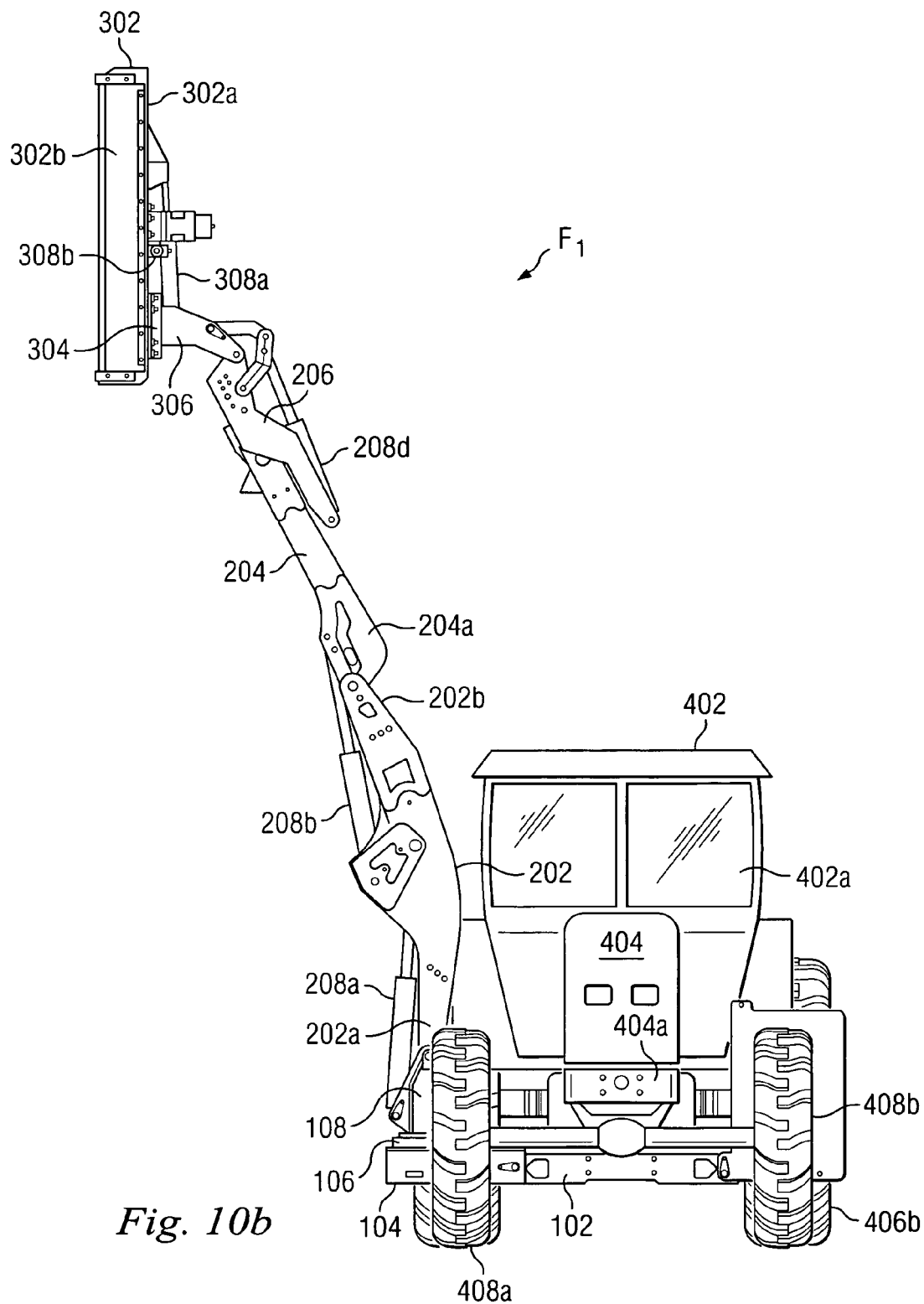

Referring now to FIGS. 10a and 10b, the mower deck 300 may be placed in a position $F_1$. In position $F_1$, the articulating boom arm 200 is extended and the mower deck 300 is located spaced apart from the side of, and above, the vehicle 400, with the front 302b of mower deck 300 substantially perpendicular to a direction $F_2$ of motion of the vehicle 400. Thus, a mower deck 300 position $F_1$ is provided which allows the mower deck 300 to cover an area which is spaced apart from the side of, and above, the vehicle 400.

Figure 11:
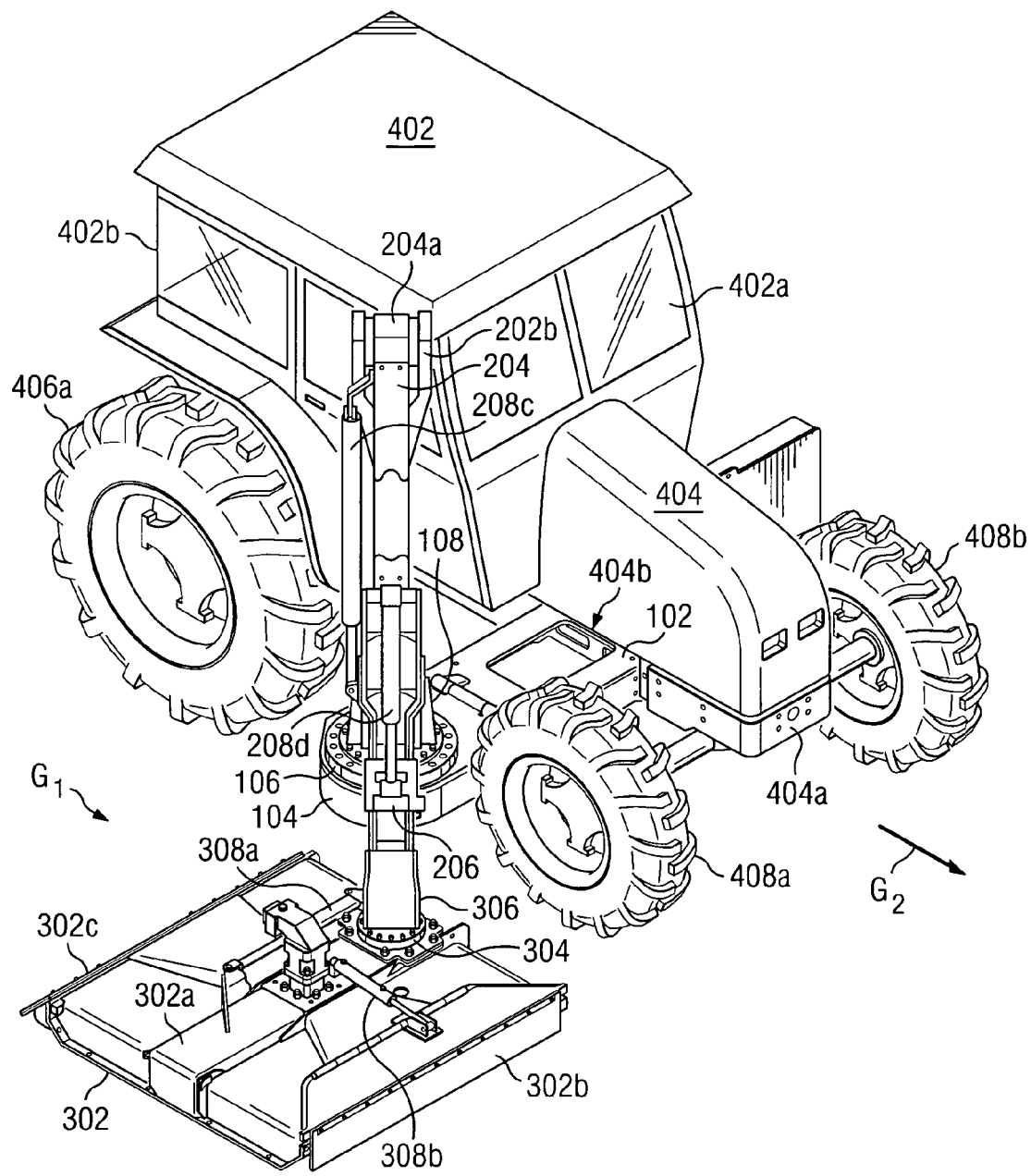
FIG. 11 is a perspective view illustrating an embodiment of the vehicle, support frame, slewing rings, articulating boom arm, and mower deck of FIG. 7, with the mower deck positioned forward the articulating boom arm mounting location and substantially perpendicular to the direction of motion of the vehicle.
Figure 12A:
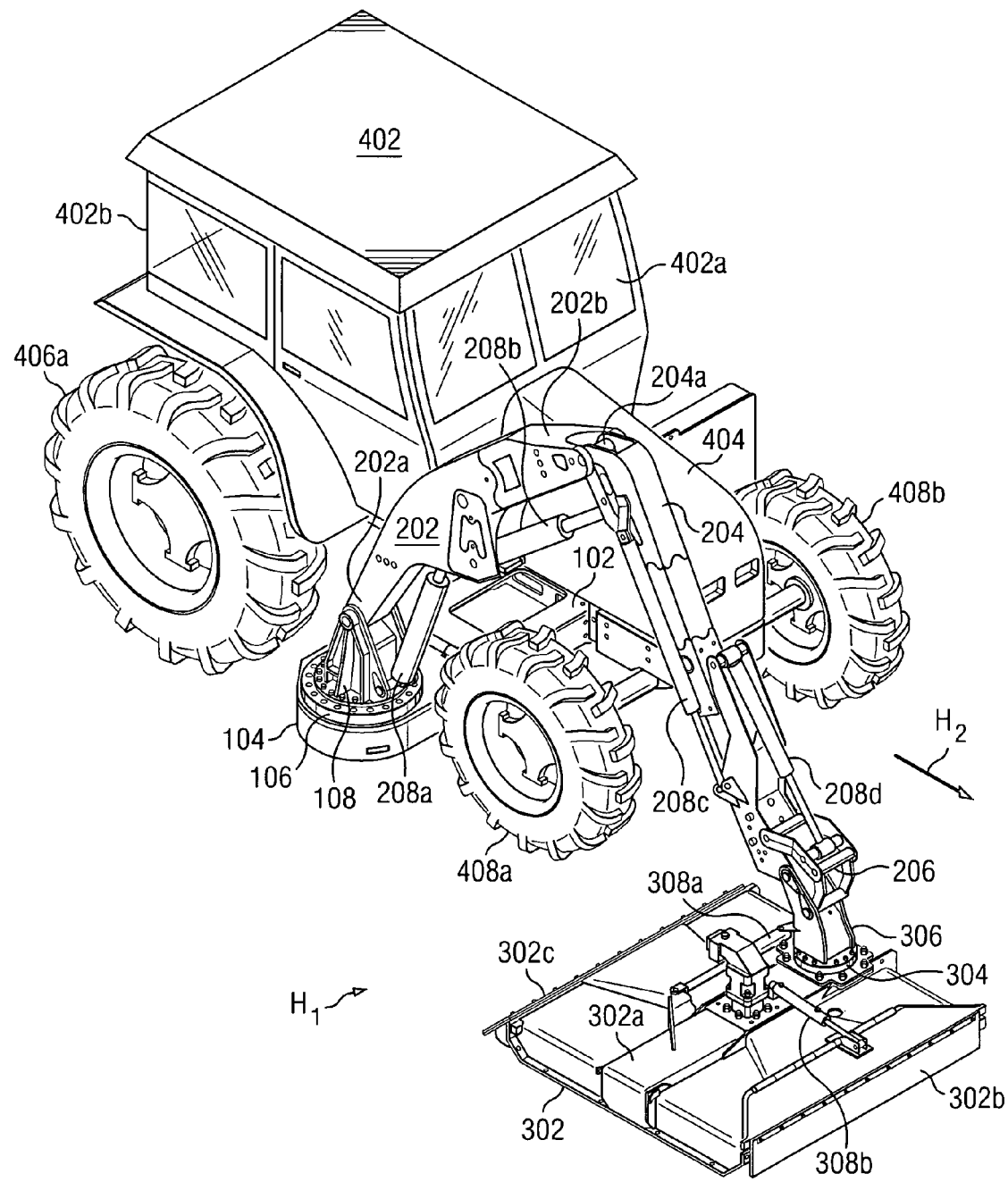
FIG. 12a is a perspective view illustrating an embodiment of the vehicle, support frame, slewing rings, articulating boom arm, and mower deck of FIG. 7, with the mower deck positioned at least partially in front of the vehicle and substantially perpendicular to the direction of motion of the vehicle.
Figure 12B:
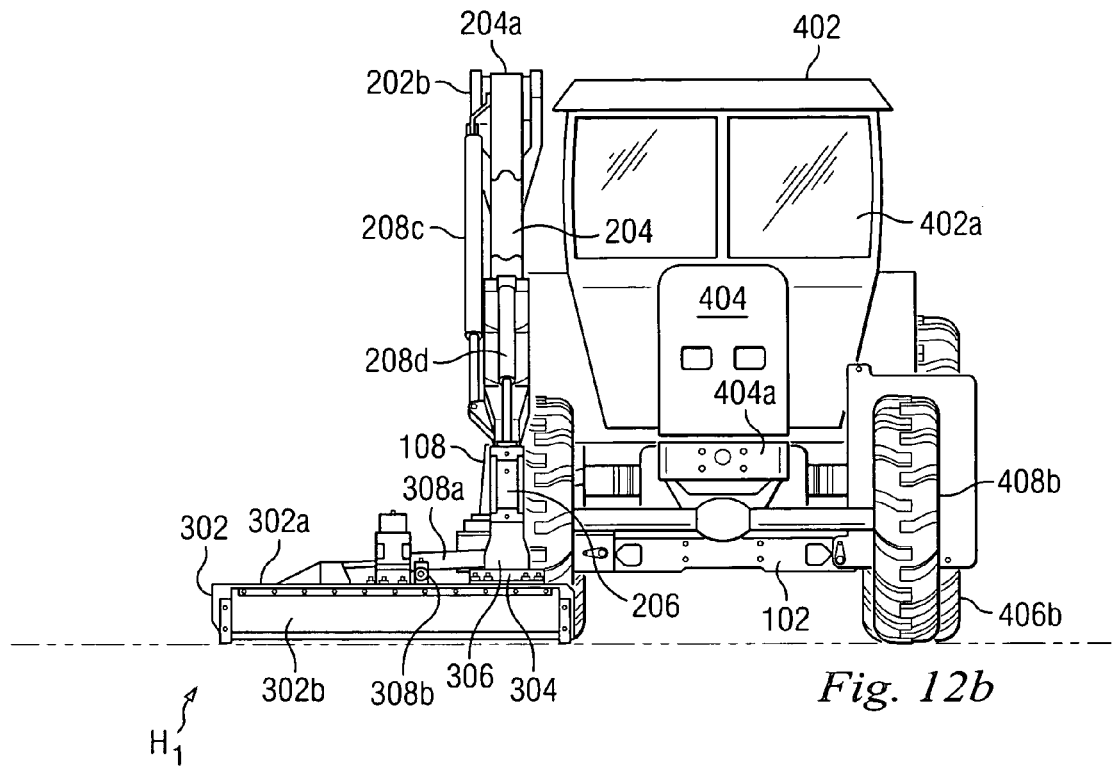

Referring now to FIGS. 5, 6, and 11, the mower deck 300 may be placed in a position $G_1$. In position $G_1$, the articulating boom arm 200 has been rotated counter-clockwise about axis A relative to the support frame 100 and vehicle 400 in order to bring the mower deck 300 forward the support frame 100 and adjacent to the front wheel 408a. The mower deck 300 has been rotated clockwise about axis B relative to the articulating boom arm 200 in order to keep the front 302b of mower deck 300 substantially perpendicular to a direction $G_2$ of motion of the vehicle 400. Thus, a mower deck 300 position $G_1$ is provided which allows the mower deck 300 to cover an area which is forward the articulating boom arm 200 mounting location while keeping the mower deck 300 perpendicular to the direction $G_2$ of motion of the vehicle 400.

Referring now to FIGS. 5, 6, 12a, and 12b, the mower deck 300 may be placed in a position $H_1$. In position $H_1$, the articulating boom arm 200 has been rotated counter-clockwise about axis A relative to the support frame 100 and vehicle 400 in order to bring the mower deck 300 forward the front 404a of engine compartment 404 of the vehicle 400 and adjacent the front wheel 408a. The mower deck 300 has been rotated clockwise about axis B relative to the articulating boom arm 200 in order to keep the front 302b of mower deck 300 substantially perpendicular to a direction $H_2$ of motion of the vehicle 400. Thus, a mower deck 300 position $H_1$ is provided which allows the mower deck 300 to cover an area which is at least partially in front of the vehicle while keeping the mower deck 300 perpendicular to the direction $H_2$ of motion of the vehicle 400.

Figure 13B:
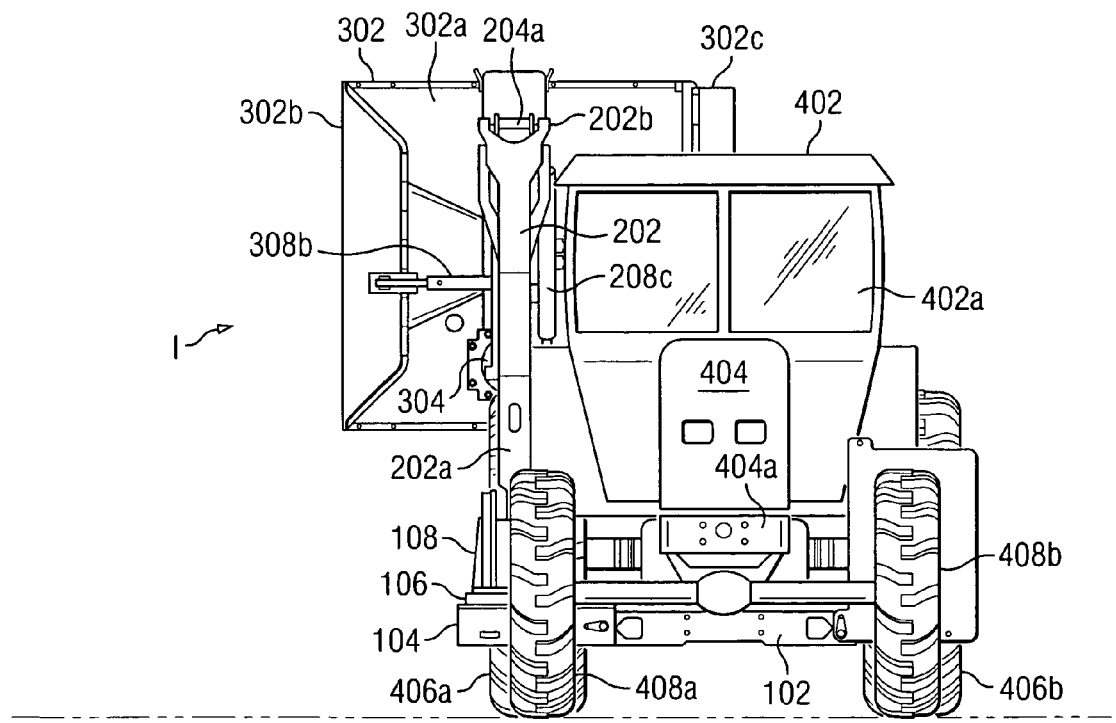
Figure 13A:
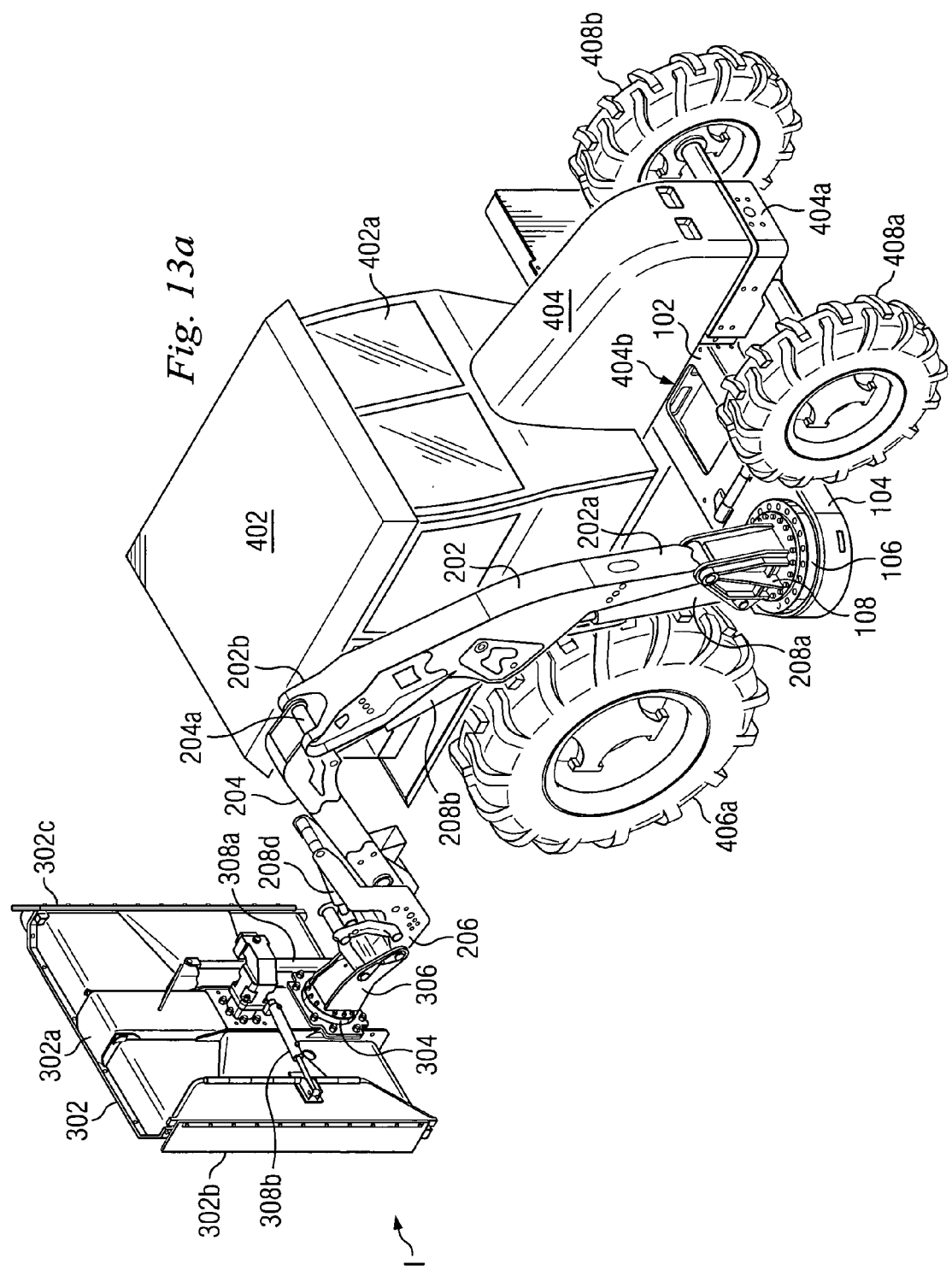
FIG. 13a is a perspective view illustrating an embodiment of the vehicle, support frame, slewing rings, articulating boom arm, and mower deck of FIG. 7, with the mower deck positioned behind the vehicle.
Figure 13C:
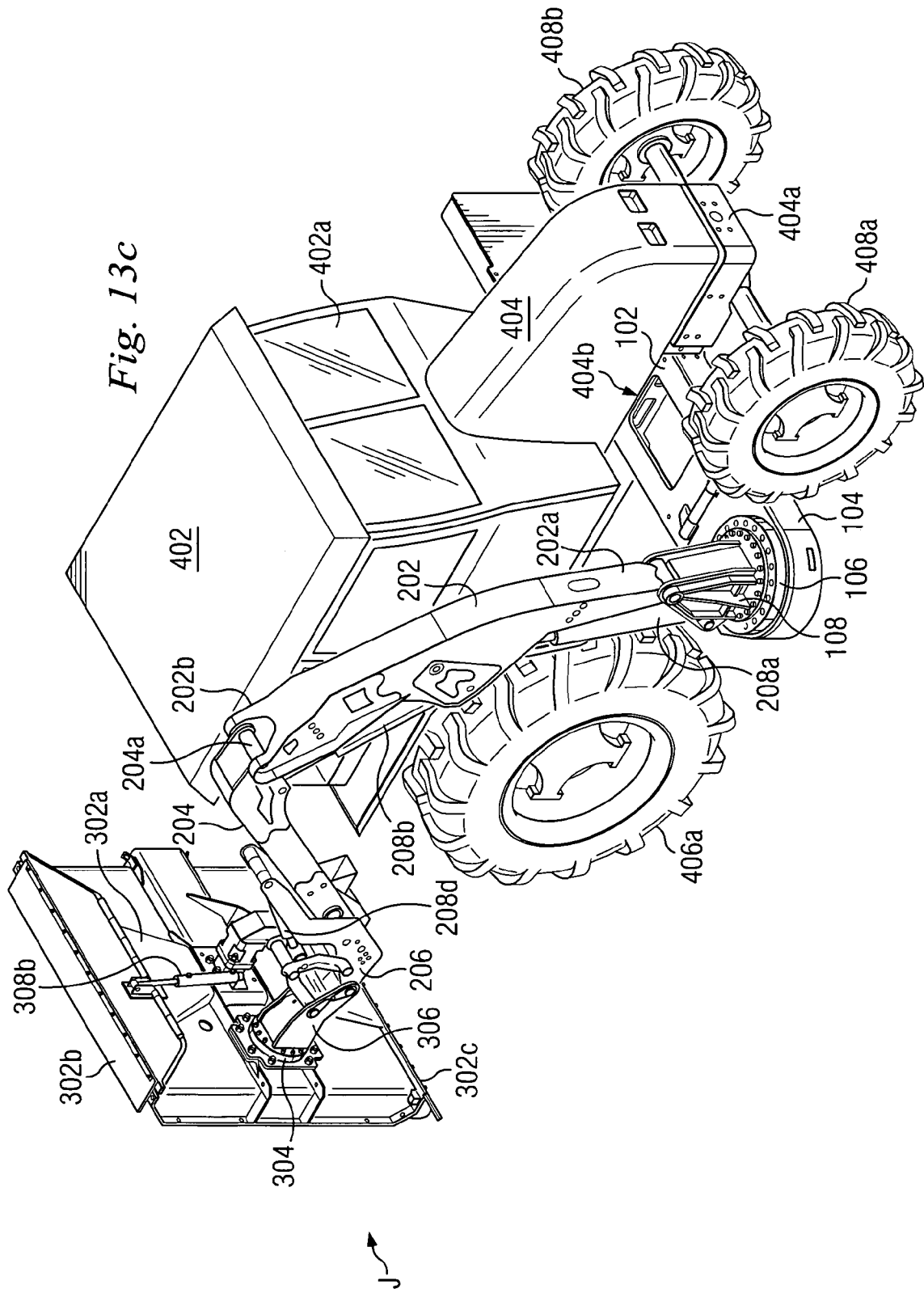
FIG. 13c is a perspective view illustrating an embodiment of the vehicle, support frame, slewing rings, articulating boom arm, and mower deck of FIG. 13a, with the mower deck rotated substantially 90 degrees.
Figure 13D:
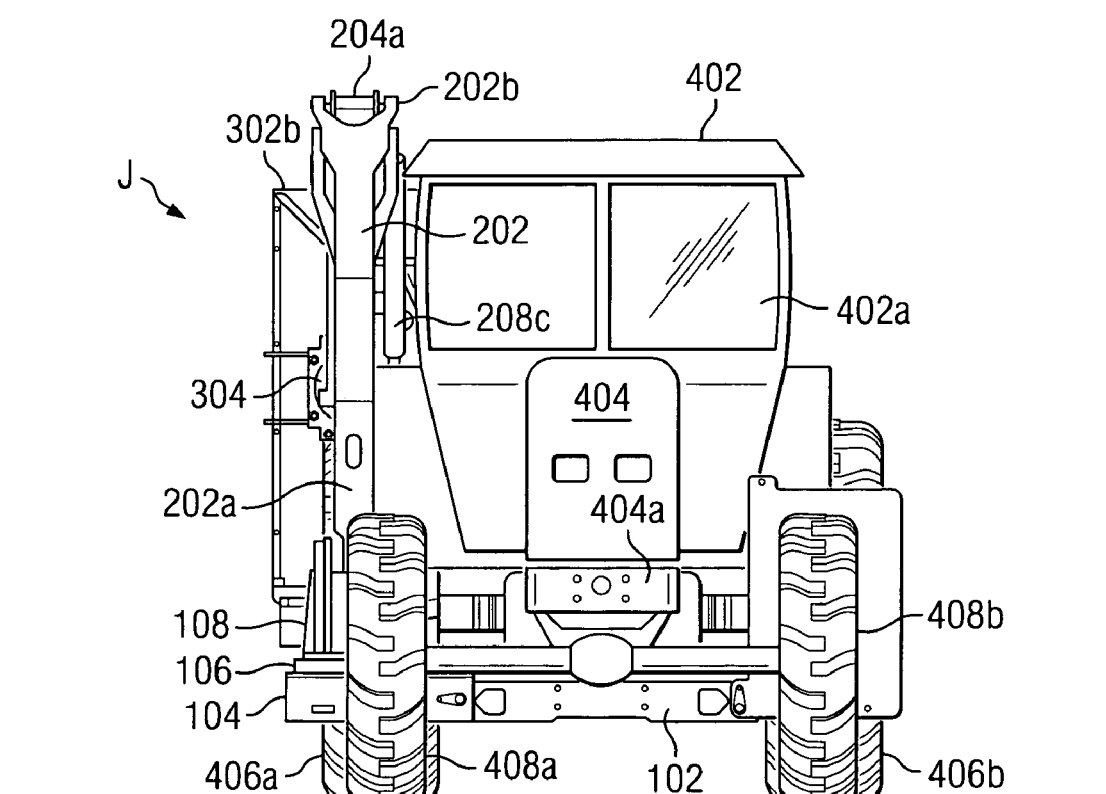
FIG. 13d is a front view illustrating an embodiment of the vehicle, support frame, slewing rings, articulating boom arm, and mower deck of FIG. 13c.

Referring now to FIGS. 4b, 5, 6, 13a, 13b, 13c, and 13d, the mower deck 300 may be placed in a position I. In position I, the articulating boom arm 200 has been rotated clockwise about axis A relative to the support frame 100 and vehicle 400 in order to bring the mower deck 300 behind the rear 402b of cab 402 of the vehicle 400 and adjacent the rear wheel 406a, as illustrated in FIGS. 13a and 13b. Thus, a mower deck 300 position I is provided which allows the mower deck 300 to be located behind the vehicle 400. The mower deck 300 may then be placed in a position J. In position J, the mower deck 300 has been rotated substantially ninety degrees clockwise about axis B relative to the articulating boom arm 200 such that the mower deck 300 is located substantially in the volume 410 located behind vehicle 400. Thus, a mower deck 300 position J is provided which allows the mower deck 300 to be positioned in a storage position behind the vehicle 400, located substantially behind the vehicle 400 and out of the way of obstructions which may be encountered that are adjacent the front wheel 408a, the rear wheel 406a, and the side of the vehicle 400, as the vehicle 400 moves forward.

It is understood that the positions $C_1$, $D_1$, $E_1$, $F_1$, $G_1$, $H_1$, I, and J have been provided merely as examples of a range of positions allowed by the coupling of the mower deck 300 to the vehicle 400 by the slewing ring bearing 304, the articulating boom arm 200, the slewing ring bearing 106, and the support frame 100. A variety of additional mower deck 300 positions are enabled by the slewing ring bearing 304, the articulating boom arm 200, the slewing ring bearing 106, and the support frame 100, which may include up to 360 degrees of rotation of the articulating boom arm 200 on the slewing ring bearing 106 and different mounting locations of the support frame 100 on a variety of vehicles such as, for example, the vehicle 400. In the present invention, FIGS. 1, 2, 4a, 4b, 6, 7 and 11, bearing 106 is mounted low on one side of the vehicle 400 and close to the vehicle between the fore and aft tires. Also, the mounting end 202a of the boom 202 is positioned to connect to boom mount 108 at a point on the axis of rotation A of bearing 106. This permits mower deck 300 to operate much closer to the vehicle.

It is understood that variations may be made in the foregoing without departing from the scope of the disclosed embodiments. Furthermore, the elements and teachings of the various illustrative embodiments may be combined in whole or in part some or all of the illustrated embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An attachment system for an articulating boom comprising:
   a support frame;
   an articulating boom mounted on and movable relative to the frame; and
   a slewing ring bearing having an axis of rotation extending vertically therefrom, the bearing being mounted on the frame and to connected to a first end of the boom, the connection of the bearing to the first end of the boom being positioned on the axis of rotation.

2. The system of claim 1 wherein the support frame is operable to be mounted to a vehicle.

3. The system of claim 1 wherein the slewing ring bearing provides the articulating boom arm rotating movement of at least 120 degrees relative to the frame.

4. The system of claim 1 wherein the slewing ring bearing provides the articulating boom arm rotating movement of at least 180 degrees relative to the frame.

5. The system of claim 1 further comprising:
   a mower deck mounted to a distal end of the articulating boom.

6. The system of claim 5 further comprising:
   another slewing ring bearing providing the mower deck with rotating movement of at least 180 degrees relative to the articulating boom.

7. A vehicle comprising:
   a support frame mounted to the vehicle;
   an articulating boom mounted on and moveable relative to the frame; and
   a slewing ring bearing having an axis of rotation extending vertically therefrom, the bearing being mounted on the frame and connected to a first end of the boom, the connection of the bearing to the first end of the boom being positioned on the axis of rotation.

8. The vehicle of claim 7 wherein the support frame is mounted to an underside of the vehicle.

9. The vehicle of claim 7 wherein the slewing ring bearing provides the articulating boom arm rotating movement of at least 120 degrees relative to the frame and the vehicle.

10. The vehicle of claim 7 wherein the slewing ring bearing provides the articulating boom arm rotating movement of at least 180 degrees relative to the frame and the vehicle.

11. The vehicle of claim 7 wherein the slewing ring bearing, and the articulating boom provide a means for positioning the mower deck at least partially in front of the vehicle and substantially perpendicular to the vehicle's direction of motion.

12. The vehicle of claim 7 wherein the slewing ring bearing, and the articulating boom provide a means for positioning the mower deck substantially behind the vehicle and substantially within a volume defined by the sides of the vehicle.

13. The vehicle of claim 7 wherein the slewing ring bearing, and the articulating boom provide a means for positioning the mower deck substantially adjacent a side of the vehicle and substantially perpendicular to the vehicle's direction of motion.

14. The vehicle of claim 7 wherein the slewing ring bearing is positioned adjacent the front of the vehicle.

15. The vehicle of claim 7 wherein the slewing ring bearing is positioned adjacent a side of the vehicle.

16. The vehicle of claim 7 wherein the slewing ring bearing is positioned adjacent the rear of the vehicle.

17. The vehicle of claim 7 further comprising:
a counter balance weight coupled to the support frame.

18. A method for attaching an articulating boom to a frame comprising:
providing a support frame;
mounting a first end of an articulating boom on and movable relative to the frame; and
connecting a slewing ring bearing between the first end of the boom and the frame, the bearing having an axis of rotation extending vertically therefrom, the mounting of the bearing to the first end of the boom being positioned on the axis of rotation.

19. The method of claim 18 further comprising:
rotating the articulating boom by at least 120 degrees relative to the support frame.

20. The method of claim 18 further comprising:
mounting the support frame to a vehicle.

21. The method of claim 20 further comprising:
counter balancing the weight of the articulating boom on the vehicle.

22. The method of claim 18 wherein the attachment is a mower deck.

23. The method of claim 22 further comprising:
rotating the mower deck at least 180 degrees relative to the articulating boom.

24. The method of claim 22 further comprising:
mounting the support frame to a vehicle; and
positioning the mower deck at least partially in front of the vehicle and substantially perpendicular to the vehicle's direction of motion.

25. The method of claim 22 further comprising:
mounting the support frame to a vehicle; and
positioning the mower deck substantially behind the vehicle and substantially within a volume defined by the sides of the vehicle.

26. The method of claim 22 further comprising:
mounting the support frame to a vehicle; and
positioning the mower deck substantially adjacent a side of the vehicle and substantially perpendicular to the vehicle's direction of motion.

* * * * *

UNITED STATES PATENT AND TRADEMARK OFFICE
CERTIFICATE OF CORRECTION

PATENT NO. : 7,175,380 B2
APPLICATION NO. : 11/009454
DATED : February 13, 2007
INVENTOR(S) : Kevin Wilson et al.

It is certified that error appears in the above-identified patent and that said Letters Patent is hereby corrected as shown below:

On the title page, item [75]:
City Of Residence For Inventor Kevin Wilson; delete "Fletcher" and insert
--San Antonio--.

Signed and Sealed this

Eleventh Day of August, 2009

David J. Kappos
*Director of the United States Patent and Trademark Office*